(12) United States Patent
Tsuchiya

(10) Patent No.: US 12,291,116 B2
(45) Date of Patent: May 6, 2025

(54) CHARGING APPARATUS AND MANAGEMENT DEVICE

(71) Applicant: TOYOTA JIDOSHA KABUSHIKI KAISHA, Aichi-ken (JP)

(72) Inventor: Yoshiyuki Tsuchiya, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 524 days.

(21) Appl. No.: 17/680,299

(22) Filed: Feb. 25, 2022

(65) Prior Publication Data
US 2022/0281333 A1    Sep. 8, 2022

(30) Foreign Application Priority Data

Mar. 3, 2021 (JP) ................................. 2021-033298

(51) Int. Cl.
| *B60L 53/31* | (2019.01) |
| *B60L 53/16* | (2019.01) |
| *B60L 53/66* | (2019.01) |
| *B60L 53/67* | (2019.01) |
| *B60L 53/20* | (2019.01) |

(52) U.S. Cl.
CPC .............. *B60L 53/31* (2019.02); *B60L 53/16* (2019.02); *B60L 53/66* (2019.02); *B60L 53/67* (2019.02); *B60L 53/20* (2019.02)

(58) Field of Classification Search
CPC ....................................................... B60L 53/31
USPC ....................................................... 320/109
See application file for complete search history.

(56) References Cited

U.S. PATENT DOCUMENTS

| 2011/0213656 | A1* | 9/2011 | Turner | ................. | B60L 53/665 |
|---|---|---|---|---|---|
| | | | | | 320/109 |
| 2012/0286730 | A1* | 11/2012 | Bonny | ................... | B60L 53/14 |
| | | | | | 320/109 |
| 2013/0046660 | A1* | 2/2013 | Lowenthal | ........... | B60L 53/665 |
| | | | | | 705/30 |
| 2013/0076296 | A1* | 3/2013 | Ushiroda | ............... | B60L 53/38 |
| | | | | | 320/109 |

(Continued)

FOREIGN PATENT DOCUMENTS

| CN | 108437826 A | 8/2018 |
|---|---|---|
| JP | 2011109807 A | 6/2011 |
| JP | 2018-142063 A | 9/2018 |

*Primary Examiner* — Jerry D Robbins
(74) *Attorney, Agent, or Firm* — HAUPTMAN HAM, LLP

(57) ABSTRACT

A charging apparatus is installed in an area in which entry of a vehicle is restricted. The charging apparatus includes: a movable portion including a connection device connectable to an energy storage device; a raising device configured to raise and lower the movable portion between a first state and a second state; a communication device; and a control device. The first state is a state in which the movable portion is housed in the ground, and the second state is a state in which the movable portion is exposed on the ground and the energy storage device and the connection device are connectable together. The control device is configured to control the raising device using information received via the communication device, and permits raising the movable portion when the movable portion is in the first state and the control device receives request information requesting emergency use of the charging apparatus.

8 Claims, 7 Drawing Sheets

(56) References Cited

U.S. PATENT DOCUMENTS

| | | | |
|---|---|---|---|
| 2013/0103574 A1* | 4/2013 | Conrad | G06Q 20/306 |
| | | | 705/39 |
| 2013/0249470 A1* | 9/2013 | Martin | B60L 53/12 |
| | | | 320/107 |
| 2013/0307477 A1* | 11/2013 | Reinschke | B60L 53/30 |
| | | | 320/109 |
| 2014/0089016 A1* | 3/2014 | Smullin | G06Q 10/02 |
| | | | 705/5 |
| 2016/0117866 A1* | 4/2016 | Stancato | H04L 12/1895 |
| | | | 705/13 |
| 2017/0008409 A1* | 1/2017 | Roberts | B60L 53/38 |
| 2018/0339597 A1* | 11/2018 | Kruszelnicki | B60L 53/305 |
| 2019/0009680 A1* | 1/2019 | Kauffmann | B60L 53/126 |
| 2021/0053456 A1 | 2/2021 | Freeling-Wilkinson | |
| 2022/0144113 A1* | 5/2022 | Freeling-Wilkinson | |
| | | | B60L 53/31 |
| 2024/0083278 A1* | 3/2024 | Aylesbury | B60L 53/31 |

\* cited by examiner

CHARGING APPARATUS AND MANAGEMENT DEVICE

CROSS-REFERENCE TO RELATED APPLICATION

This application claims priority to Japanese Patent Application No. 2021-033298 filed on Mar. 3, 2021, incorporated herein by reference in its entirety.

BACKGROUND

1. Technical Field

The present disclosure relates to charging apparatuses and management devices.

2. Description of Related Art

A charging apparatus for charging an energy storage device mounted on a vehicle etc. is installed outside the vehicle etc., such as in a parking lot or on a sidewalk. However, such charging apparatus may disturb traveling of vehicles or walking as it occupies installation space. A technique of storing movable charging apparatus in the ground is known in the art.

For example, Japanese Unexamined Patent Application Publication No. 2011-109807 (JP 2011-109807 A) discloses a charging pole that is installed so that it can be raised to stand on the ground and can be lowered to be housed in the ground.

SUMMARY

Such movable charging apparatus may be installed not only in a parking lot but also in an area within a park etc. in which entry of vehicles is restricted, in case of emergency use such as in the event of a disaster. However, if the charging apparatus installed in such an area can be easily used, vehicles may enter the area in order to use the charging apparatus. On the other hand, if the charging apparatus installed in such an area can not always be used, the convenience of the charging apparatus in an emergency may be reduced.

The present disclosure provides a charging apparatus and a management device that can be used without reducing the convenience in an emergency.

A charging apparatus according to a first aspect of the present disclosure is charging apparatus installed on a bottom of a recess in ground and configured to charge an energy storage device mounted on a vehicle. The charging apparatus is installed in an area in which entry of the vehicle is restricted. The charging apparatus includes: a movable portion including a connection device that is connectable to the energy storage device; a raising device configured to raise and lower the movable portion between a first state and a second state; a communication device configured to communicate with a device outside the charging apparatus; and a control device. The first state is a state in which the movable portion is housed in the ground, and the second state is a state in which the movable portion is exposed on the ground and the energy storage device and the connection device are connectable together. The control device is configured to control the raising device using information received via the communication device, and is configured to permit raising the movable portion when the movable portion is in the first state and the control device receives request information via the communication device, the request information being information requesting emergency use of the charging apparatus.

According to the charging apparatus of the first aspect of the present disclosure, the control device permits raising the movable portion of the charging apparatus when the control device receives the request information requesting emergency use of the charging apparatus such as in a case of a disaster or when an event is held. The charging apparatus can therefore be used in an emergency in which the number of users increases.

In the charging apparatus of the first aspect of the present disclosure, the emergency use of the charging apparatus may include at least either use of the charging apparatus in case of a disaster in a region including the area or use of the charging apparatus during an event held in the region.

According to the charging apparatus of the first aspect of the present disclosure, the charging apparatus can be used in an emergency in which the number of users increases, such as in a case of a disaster or when an event is held.

In the charging apparatus of the first aspect of the present disclosure, the control device may prohibit raising the movable portion when the movable portion is in the first state and the control device does not receive the request information.

According to the charging apparatus of the first aspect of the present disclosure, the control device prohibits raising the movable portion of the charging apparatus when the control device does not receive the request information requesting emergency use of the charging apparatus. This reduces the possibility that the charging apparatus installed in the area in which entry of the vehicle is restricted may be used in a non-emergency situation.

A management device according to a second aspect of the present disclosure is a management device configured to manage operation of a plurality of charging apparatuses, each of the charging apparatuses being installed on a bottom of a recess in ground and being configured to charge an energy storage device mounted on a vehicle. Each of the charging apparatuses includes a movable portion, a raising device, a communication device, and a control device, the movable portion including a connection device that is connectable to the energy storage device, and the communication device being configured to communicate with the management device. The raising device is configured to raise and lower the movable portion between a first state and a second state. The first state is a state in which the movable portion is housed in the ground, and the second state is a state in which the movable portion is exposed on the ground and the energy storage device and the connection device are connectable together. The control device is configured to control the raising device using information received via the communication device. The charging apparatuses are installed in each of a first area in which entry of the vehicle is restricted and a second area in which entry of the vehicle is not restricted. The management device includes a processor. The processor is configured to permit raising the movable portions of the charging apparatuses when the processor receives request information, the request information being information requesting emergency use of the charging apparatuses. The processor is configured to prohibit raising the movable portion of the charging apparatus in the first area and permit raising the movable portion of the charging apparatus in the second area when the processor does not receive the request information.

According to the management device of the second aspect of the present disclosure, the processor permits raising the movable portion of the charging apparatus in the first area when the processor receives the request information requesting emergency use of the charging apparatus such as in a case of a disaster or when an event is held. The charging apparatus can therefore be used in an emergency in which the number of users increases. Moreover, the processor prohibits raising the movable portion of the charging apparatus in the first area when the processor does not receive the request information requesting emergency use of the charging apparatus. This reduces the possibility that the charging apparatus installed in the first area may be used in a non-emergency situation.

In the management device of the second aspect of the present disclosure, the emergency use of the charging apparatuses may include at least either use of the charging apparatuses in a case of a disaster in a region including the first area and the second area or use of the charging apparatuses during an event held in the region.

According to the management device of the second aspect of the present disclosure, the charging apparatuses can be used in an emergency in which the number of users increases, such as in a case of a disaster or when an event is held.

According to the present disclosure, the charging apparatus and the management device that can be used without reducing the convenience in an emergency can be provided.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, an embodiment of the present disclosure will be described in detail with reference to the drawings. The same or corresponding parts are denoted by the same signs throughout the drawings, and description thereof will not be repeated.

Hereinafter, the configuration of a charging station 300 that is charging apparatus according to an embodiment of the present disclosure will be described by way of example.

Figure 1:
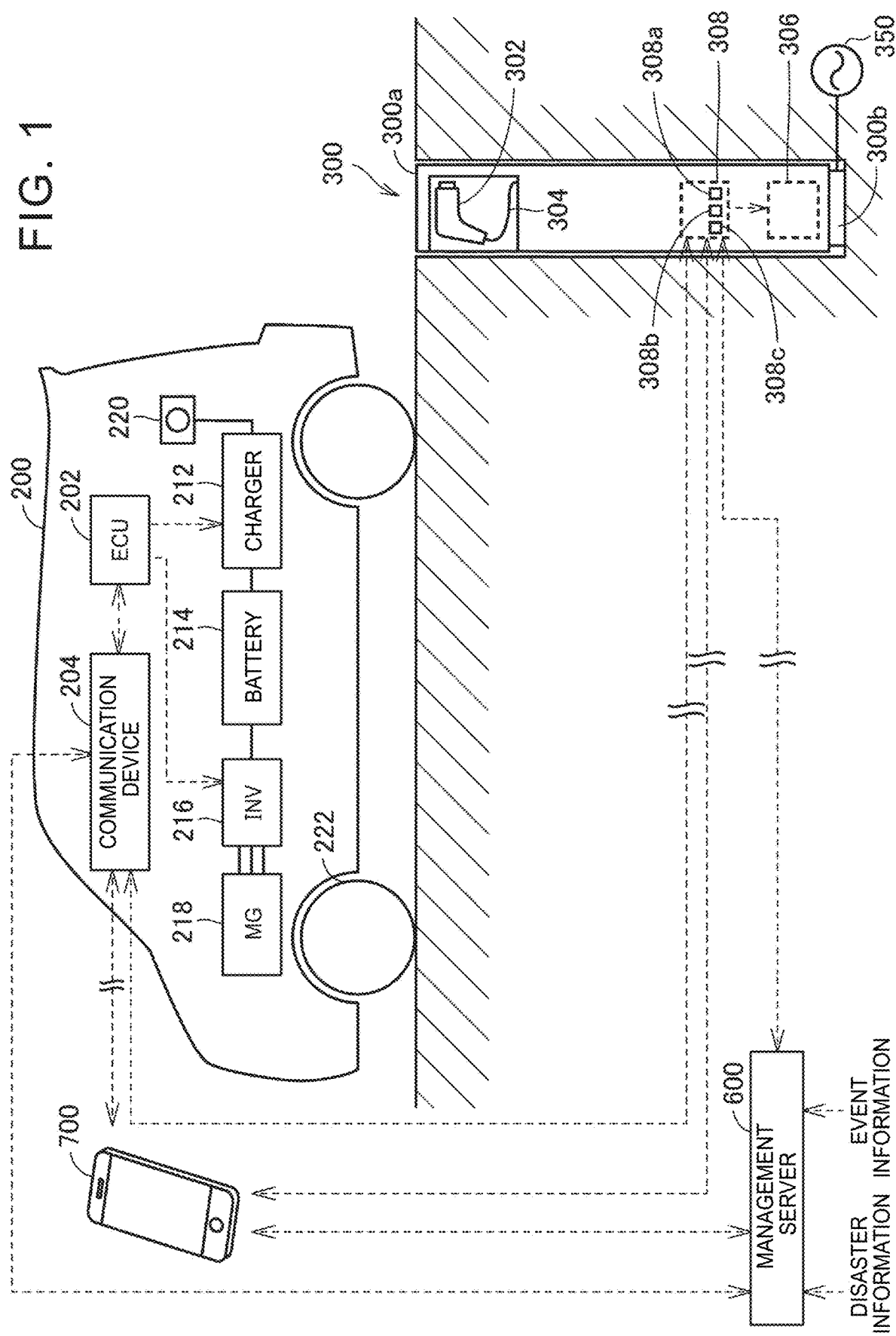
FIG. 1 shows an example of a configuration of an electrically powered vehicle and a configuration of a charging station with a movable portion housed in the ground.
Figure 2:
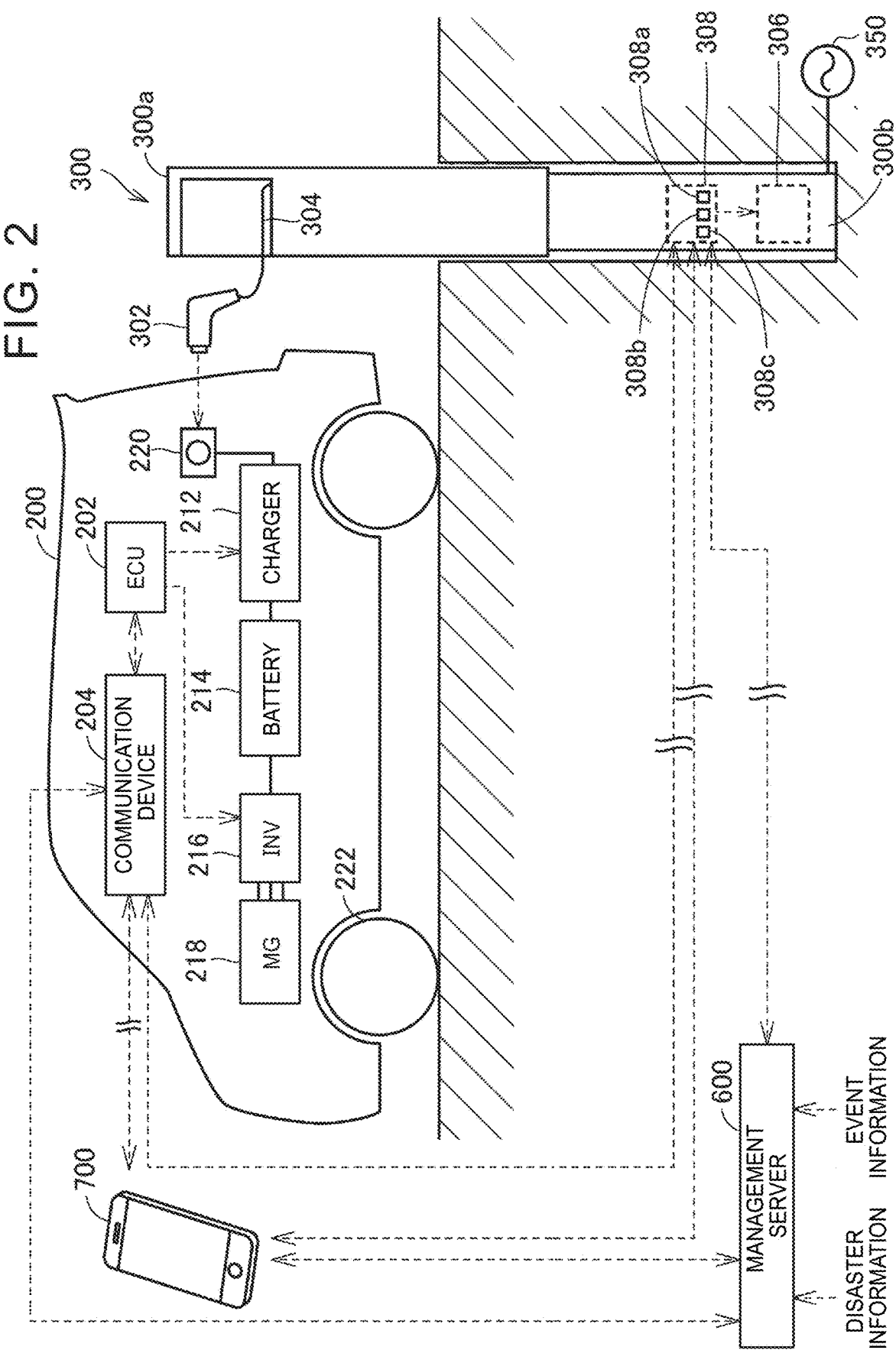
FIG. 2 shows an example of the configuration of the electrically powered vehicle and the configuration of the charging station with the movable portion exposed on the ground.

FIG. 1 shows an example of the configuration of an electrically powered vehicle 200 and the charging station 300 with a movable portion 300a (described later) housed in the ground. FIG. 2 shows an example of the configuration of the electrically powered vehicle 200 and the charging station 300 with the movable portion 300a exposed on the ground.

As shown in FIGS. 1 and 2, the charging station 300 can be switched between a first state (see FIG. 1) and a second state (see FIG. 2). The first state is a state in which the upper end of the charging station 300 is substantially flush with the ground with the movable portion 300a housed in the ground. The second state is a state in which the upper end of the charging station 300 is located at a predetermined position above the ground with the movable portion 300a exposed on the ground.

The charging station 300 has, for example, a cylindrical housing and is installed on the bottom of a recess formed in the ground. The recess is formed in the ground so that there is predetermined clearance between the inner peripheral surface of the recess and the outer peripheral surface of the housing of the charging station 300 and that the depth of the recess is about the same as the vertical length of the charging station 300 in the first state.

The charging station 300 includes the movable portion 300a and a fixed portion 300b. The charging station 300 has a storage space in the upper part of the movable portion 300a. The storage space can store a connector 302. A cable 304 has its one end connected to the connector 302 and the other end connected to a power supply 350. The power supply 350 is, for example, an alternating current (AC) power supply such as a commercial power supply. The cable 304 has, for example, a shaped extendable portion having a curled part or a structural extendable portion having a reel-in structure. When the connector 302 is taken out of the charging station 300, the cable 304 can be extended to an inlet 220 of the electrically powered vehicle 200 parked in a parking space.

The fixed portion 300b is fixed to the bottom of the recess formed in the ground. The fixed portion 300b need not necessarily be fixed to the bottom of the recess, and may be fixed to any part of the recess formed in the ground.

The fixed portion 300b includes a raising device 306 and a control device 308. The raising device 306 raises and lowers the movable portion 300a in the vertical direction, and the control device 308 controls the operation of the raising device 306.

The raising device 306 includes an actuator that raises and lowers the movable portion 300a. For example, the raising device 306 may have a rack and pinion mechanism in which a pinion gear meshes with a rack gear fixed to the movable portion 300a. This mechanism raises and lowers the movable portion 300a by rotating the pinion gear using an electric actuator. The raising device 306 may have a mechanism using a hydraulic cylinder, namely a mechanism in which a rod connected to a piston is fixed to the movable portion 300a and a cylinder body is fixed to the fixed portion 300b. This mechanism raises and lowers the movable portion 300a by increasing and decreasing an oil pressure to be supplied to the cylinder body. Alternatively, the raising device 306 may have a mechanism that raises and lowers the movable portion 300a by generating a magnetic repulsive force between the movable portion 300a and the fixed portion 300b.

For example, the raising device 306 is configured not to lower the movable portion 300a to a position lower than the position corresponding to the first state by a stopper mechanism etc., and is also configured not to raise the movable portion 300a to a position higher than the position corresponding to the second state by the stopper mechanism etc. The control device 308 includes a central processing unit (CPU) 308a, a memory 308b composed of a read-only memory (ROM), a random access memory (RAM), etc., and a communication unit 308c capable of communicating with an external device. The control device 308 controls an electric device (e.g., the raising device 306) provided in the charging station 300, based on information stored in the memory 308b, information received via the communication unit 308c, and other information acquired from sensors, not shown. This control is not limited to software processing executed by the CPU 308a, and may be constructed by dedicated hardware (electronic circuit).

The communication unit 308c can communicate various kinds of information etc. with the external device outside the charging station 300. FIGS. 1 and 2 show, by way of example, that the communication unit 308c and a mobile terminal 700 can communicate with each other and that the communication unit 308c and a management server 600 can communicate with each other.

The communication unit 308c may be configured to communicate with the management server 600 by, for example, wired communication. The communication unit 308c may be configured to communicate with the mobile terminal 700 or the management server 600 by, for example, wireless communication.

The control device 308 performs raising control of the raising device 306 to switch the charging station 300 from the first state to the second state, when, for example, conditions for performing the raising control are satisfied. The conditions for performing the raising control include, for example, a condition that the charging station 300 is in the first state and a condition that there is a request to perform the raising control for the charging station 300 (hereinafter referred to as a raising request). For example, the control device 308 may receive information indicating a raising request from the mobile terminal 700, or may determine based on information from the external device whether there is a raising request.

Alternatively, the control device 308 performs lowering control of the raising device 306 to switch the charging station 300 from the second state to the first state, when, for example, conditions for performing the lowering control are satisfied. The conditions for performing the lowering control include, for example, a condition that the charging station 300 is in the second state and a condition that there is a request to perform the lowering control for the charging station 300 (hereinafter referred to as a lowering request). For example, the control device 308 may receive information indicating a lowering request from the mobile terminal 700, or may determine based on information from the external device whether there is a lowering request.

The management server 600 includes a control device, a communication device, and a storage device (none of which are shown). The control device of the management server 600 is composed of a CPU, a memory, etc. The communication device of the management server 600 is configured to communicate with the charging station 300, the mobile terminal 700, or other device via a communication network or directly. The communication device of the management server 600 is configured to communicate with, for example, a terminal or server (none of which are shown) of an organization that manages an area where the charging station 300 is installed, a local government of a region including the area, or an event organizer that will be described later. Predetermined information is stored in the storage device of the management server 600. The control device of the management server 600 receives predetermined information from the mobile terminal 700 or the charging station 300 via the communication device of the management server 600, and stores a part or all of the received information in the storage device.

The mobile terminal 700 is a terminal that can be carried by a user. The mobile terminal 700 includes, for example, a display device, an input device, and a communication device (none of which are shown). The communication device of the mobile terminal 700 is configured to communicate with the management server 600 via the communication network (not shown). The communication device of the mobile terminal 700 is configured to communicate with the charging station 300 via the communication network or directly.

FIGS. 1 and 2 further show an example of the configuration of the electrically powered vehicle 200 parked in a parking space where the electrically powered vehicle 200 can be charged by the charging station 300. As shown in FIGS. 1 and 2, the electrically powered vehicle 200 includes a vehicle equipped with an energy storage device, such as a plug-in hybrid vehicle and an electric vehicle. The electrically powered vehicle 200 need only have a configuration capable of receiving electric power from the charging station 300, and is not particularly limited to the vehicles mentioned above. For example, the electrically powered vehicle 200 may be a vehicle equipped with an energy storage device for supplying electric power to the outside.

The electrically powered vehicle 200 includes an electronic control unit (ECU) 202, a communication device 204, a charger 212, a battery 214, an inverter 216, a motor generator 218, and the inlet 220.

The ECU 202 includes a CPU and a memory composed of a ROM, a RAM, etc. The ECU 202 controls an electric device (e.g., the charger 212 or the inverter 216) of the electrically powered vehicle 200 based on information stored in the memory or information acquired from sensors, not shown.

The communication device 204 is configured to communicate various kinds of information etc. with an external device outside the electrically powered vehicle 200. For example, the communication device 204 is configured to communicate with the management server 600 and is also configured to communicate with the charging station 300. The communication device 204 may be configured to communicate with the mobile terminal 700 carried by the user who charges the electrically powered vehicle 200 by the charging station 300.

When AC power is supplied from the inlet 220 to the charger 212, the charger 212 converts the supplied AC power to direct current (DC) power and supplies the DC power to the battery 214. The battery 214 is charged by the operation of the charger 212. The charger 212 is controlled by, for example, control signals from the ECU 202.

The battery 214 is, for example, a rechargeable energy storage element. Typically, a secondary battery such as a nickel metal hydride battery or a lithium ion battery containing a liquid or solid electrolyte is used as the battery 214. Alternatively, the battery 214 may be any energy storage device capable of storing electric power. For example, a large capacity capacitor may be used instead of the battery 214.

The inverter 216 converts, for example, the DC power of the battery 214 to AC power and supplies the AC power to the motor generator 218. The inverter 216 converts, for example, the AC power (regenerative power) of the motor generator 218 to DC power and supplies the DC power to the battery 214 to charge the battery 214.

The motor generator 218 receives the electric power from the inverter 216 and applies a rotational force to drive wheels 222. The drive wheels 222 rotate by the rotational force received from the motor generator 218 and move the electrically powered vehicle 200.

The inlet 220 together with a cover (not shown) such as a lid is located on an exterior portion of the electrically powered vehicle 200. The inlet 220 is a power receiving unit that receives charging power from external charging apparatus (e.g., the charging station 300). The inlet 220 is shaped so that the connector 302 of the charging station 300 can be attached to the inlet 220. Both the inlet 220 and the connector 302 have a built-in contact. When the connector 302 is attached to the inlet 220, the contacts come into contact with each other, so that the inlet 220 and the connector 302 are electrically connected. At this time, the battery 214 of the electrically powered vehicle 200 becomes ready for charging with the electric power supplied from the charging station 300.

Figure 3:
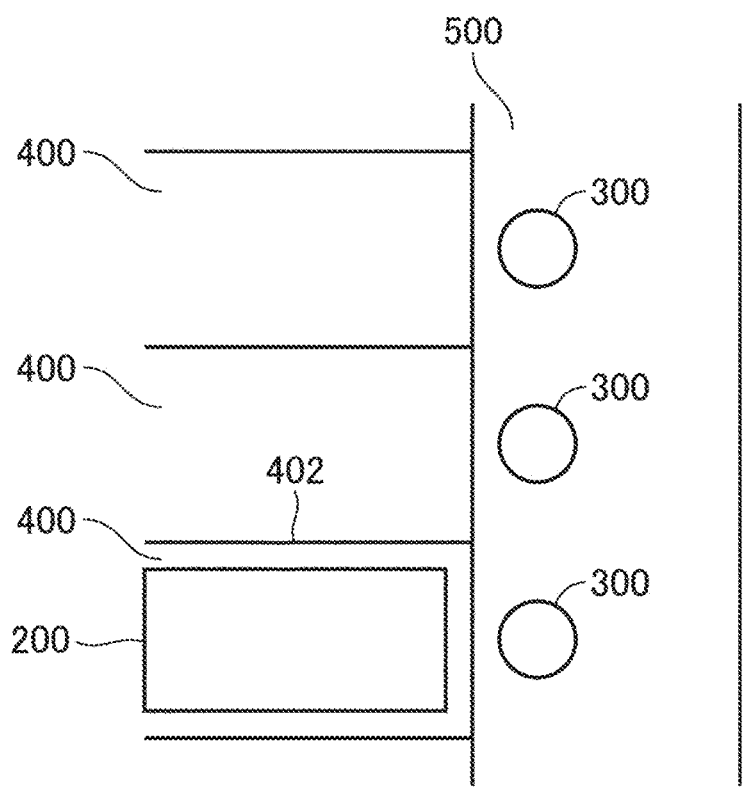
FIG. 3 shows an example of the arrangement of charging stations and parking spaces.

The charging station 300 may be installed on a sidewalk adjacent to a plurality of parking spaces in a parking lot, a sidewalk adjacent to a plurality of parking spaces on a road, etc. FIG. 3 shows an example of the arrangement of the charging stations 300 and parking spaces 400. As shown in FIG. 3, when the parking spaces 400 are located side by side in a parking lot with a dividing line 402 between adjacent ones of the parking spaces 400, the charging stations 300 are installed at positions adjacent to each parking space 400. FIG. 3 shows, by way of example, a configuration in which a sidewalk 500 is located at one longitudinal ends of the parking spaces 400 (on the right side of the paper of FIG. 3). In this case, the charging stations 300 are installed along the sidewalk 500. When the electrically powered vehicle 200 is parked in one of the parking spaces 400 and the charging station 300 is in the second state, the user takes the connector 302 out of the charging station 300 and connects the connector 302 to the inlet 220 of the electrically powered vehicle 200.

Figure 4:
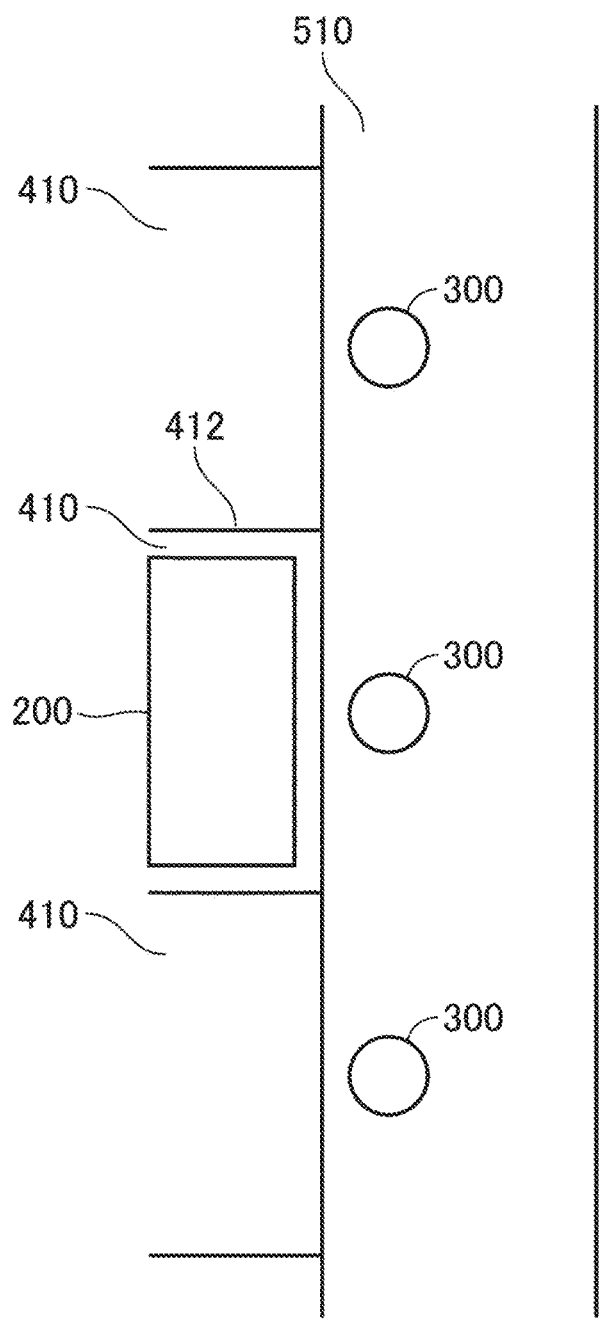
FIG. 4 shows another example of the arrangement of charging stations and parking spaces.

FIG. 4 shows another example of the arrangement of the charging stations 300 and parking spaces 410. As shown in FIG. 4, even when the parallel parking spaces 410 are located along a road with a dividing line 412 between adjacent ones of the parking spaces 410, the charging stations 300 are installed at positions adjacent to each parking space 410. FIG. 4 shows, by way of example, a configuration in which the parking spaces 410 are arranged along a sidewalk 510. In this case, the charging stations 300 are installed along the sidewalk 510. When the electrically powered vehicle 200 is parked in one of the parking spaces 410 and the charging station 300 is in the second state, the user takes the connector 302 out of the nearest charging station 300 and connects the connector 302 to the inlet 220 of the electrically powered vehicle 200.

The movable charging station 300 that can be raised and lowered as described above may be installed not only in a parking lot as described above but also in an area within a park etc. in which entry of vehicles is restricted, in case of emergency use such as in the event of a disaster. However, when the charging station 300 installed in such an area can be easily used, vehicles may enter the area in order to use the charging station 300. On the other hand, when the charging station 300 installed in such an area can not always be used, the convenience of the charging station 300 in an emergency may be reduced.

In the present embodiment, in the case where the charging station 300 is installed in an area in which entry of vehicles is restricted, the control device 308 of the charging station 300 permits raising the movable portion 300a of the charging station 300 when the charging station 300 is in the first state and the control device 308 receives via the communication unit 308c request information requesting emergency use of the charging station 300. In the present embodiment, the emergency use of the charging station 300 includes at least either the use of the charging station 300 in a case of a disaster in a region including the area or the use of the charging station 300 during an event held in the region. The request information includes at least either disaster information or event information that will be described later.

The charging station 300 installed in the area can thus be used in a situation in which the number of users increases, such as in the event of a disaster or when an event is held.

Figure 5:
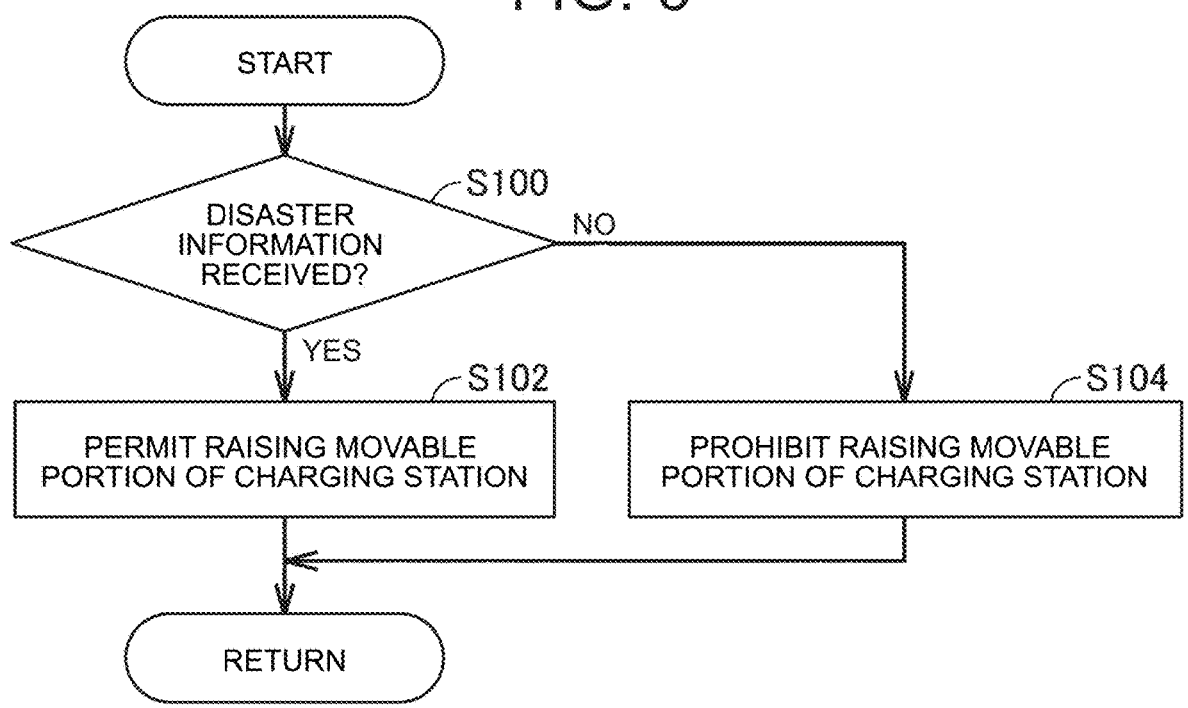
FIG. 5 is a flowchart showing an example of a process that is performed by a control device of the charging station.

Hereinafter, an example of a control process that is performed by the control device 308 will be described with reference to FIG. 5. FIG. 5 is a flowchart showing an example of the process that is performed by the control device 308 of the charging station 300. A series of steps shown in this flowchart is repeatedly performed in predetermined control cycles. It is herein assumed that the charging station 300 is installed in the area in which entry of vehicles is restricted.

In step (hereinafter, "step" is abbreviated as "S") 100, the control device 308 determines whether it has received disaster information. For example, the control device 308 determines whether it has received disaster information from the management server 600. The disaster information includes information indicating that a disaster (e.g., an earthquake, a typhoon, or heavy rain) has occurred in a region (e.g., a municipality) including the area where the charging station 300 is installed. When the management server 600 receives from, for example, a terminal or server of a local government of the region the disaster information indicating that a disaster has occurred in the region, the management server 600 sends the received disaster information to the charging station 300 installed in the area in which entry of the electrically powered vehicle 200 is restricted. When the control device 308 receives the disaster information from the management server 600, the control device 308 sets a flag indicating that the control device 308 has received the disaster information. When the flag is on, the control device 308 determines that it has received the disaster information. When the control device 308 determines that it has received the disaster information (YES in S100), the routine proceeds to S102.

In S102, the control device 308 permits raising the movable portion 300a of the charging station 300.

As the control device 308 permits raising the movable portion 300a, the control device 308 controls the raising device 306 to switch the charging station 300 from the first state to the second state in response to, for example, a charging request sent from the user's mobile terminal 700.

When the user sends a charging request to the charging station 300 using the mobile terminal 700, the user establishes communication between the mobile terminal 700 and the charging station 300 by starting a dedicated application and performing an operation for establishing the communication or the mobile terminal 700 automatically establishes communication with the charging station 300, when, for example, the mobile terminal 700 enters the range in which the mobile terminal 700 can communicate with the charging station 300.

When the user further performs a predetermined operation etc. on the mobile terminal 700, the mobile terminal 700 sends raising request information requesting raising of the movable portion 300a to the charging station 300, or automatically sends the raising request information to the charging station 300 when communication is established.

When the control device 308 receives the raising request information from the mobile terminal 700, the control device 308 determines that there is a raising request. At this time, when the charging station 300 is in the first state, the control device 308 controls the raising device 306 to switch the charging station 300 to the second state. The control device 308 may perform the raising control after, for example, a predetermined authentication process is performed between the mobile terminal 700 and the charging station 300.

Alternatively, when the control device 308 receives the raising request information from the management server 600, the control device 308 determines that there is a raising request. At this time, when the charging station 300 is in the first state, the control device 308 controls the raising device 306 to switch the charging station 300 to the second state. The management server 600 may send the raising request information in addition to the disaster information to the charging station 300, or may send the raising request information to the charging station 300 after predetermined time has passed since the management server 600 sent the disaster information to the charging station 300. The control device 308 then ends the process.

When the control device 308 determines that it has not received the disaster information (NO in S100), the routine proceeds to S104.

In S104, the control device 308 prohibits raising the movable portion 300a of the charging station 300. In this case, the control device 308 keeps the charging station 300 in the first state even when the control device 308 receives the raising request information from the management server 600 or the mobile terminal 700. Alternatively, the control device 308 may not allow to establish communication with the mobile terminal 700 when the control device 308 prohibits raising the movable portion 300a. The control device 308 may control the raising device 306 to the first state when, for example, the charging station 300 is in the second state. The control device 308 then ends the process.

Figure 6:
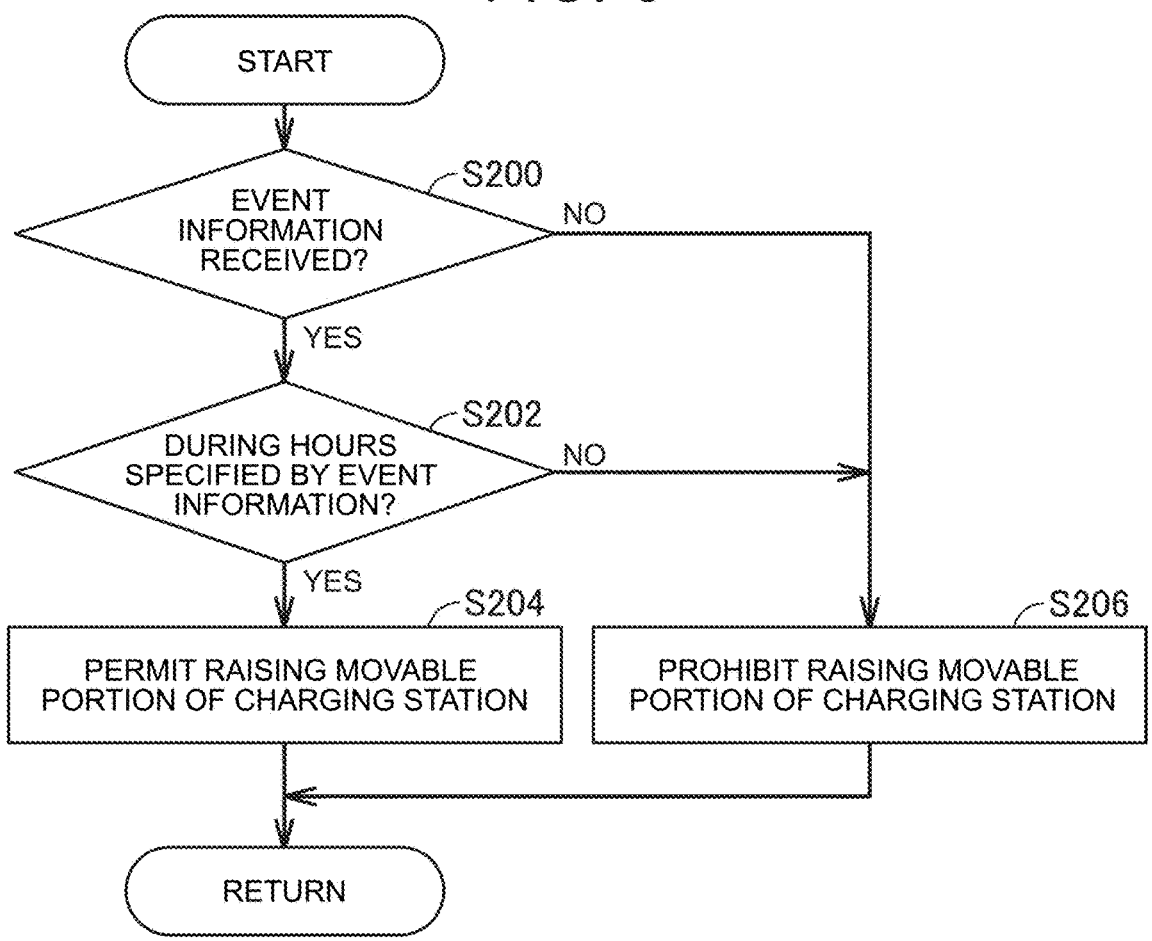
FIG. 6 is a flowchart showing another example of the process that is performed by the control device of the charging station.

Next, another example of the control process that is performed by the control device 308 will be described with reference to FIG. 6. FIG. 6 is a flowchart showing another example of the process that is performed by the control device 308 of the charging station 300. A series of steps shown in this flowchart is repeatedly performed in predetermined control cycles. It is herein assumed that the charging station 300 is installed in the area in which entry of vehicles is restricted.

In S200, the control device 308 determines whether it has received event information. For example, the control device 308 determines whether it has received event information from the management server 600. The event information includes information about an event that is held in a region including the area in which the charging station 300 is installed. Specifically, the event information includes information on the hours and period of time during which the charging station 300 installed in the area in which entry of vehicles is restricted can be used according to the period during which the event is held.

When the management server 600 receives the event information from, for example, a terminal or server of an event organizer, an organization that manages the area, or a local government of the region including the area, the management server 600 sends the received event information to the charging station 300 installed in the area in which entry of vehicles is restricted. When the control device 308 receives the event information from the management server 600, the control device 308 sets a flag indicating that the control device 308 has received the event information. When the flag is on, the control device 308 determines that it has received the event information. When the control device 308 determines that it has received the event information (YES in S200), the routine proceeds to S202.

In S202, the control device 308 determines whether the current time is during the hours specified by the event information. For example, the control device 308 may acquire the current time using a timer device (not shown) or may acquire the current time from the management server 600. When the control device 308 determines that the current time is during the hours specified by the event information (YES in S202), the routine proceeds to S204.

In S204, the control device 308 permits raising the movable portion 300a of the charging station 300. When the control device 308 receives raising request information from the management server 600 or the mobile terminal 700 and the charging station 300 is in the first state, the control device 308 controls the raising device 306 to switch the charging station 300 to the second state. The control device 308 then ends the process.

When the control device 308 determines that it has not received the event information (NO in S200) or when the control device 308 determines that the current time is not during the hours specified by the event information (NO in S202), the routine proceeds to S206.

In S206, the control device 308 prohibits raising the movable portion 300a of the charging station 300. In this case, the control device 308 keeps the charging station 300 in the first state even when the control device 308 receives the raising request information from the management server 600 or the mobile terminal 700. Alternatively, the control device 308 may not allow to establish communication with the mobile terminal 700 when the control device 308 prohibits raising the movable portion 300a. The control device 308 may control the raising device 306 to the first state when the charging station 300 is in the second state. The control device 308 then ends the process.

An example of the operation of the control device 308 of the charging station 300 based on the above structure and flowchart will be described. The charging station 300 is the charging apparatus according to the present embodiment. It is herein assumed that the charging station 300 is installed in the area in which entry of vehicles is restricted and that the charging station 300 is in the first state.

For example, when a disaster occurs in the region including the area in which entry of vehicles is restricted, disaster information indicating that a disaster has occurred is sent from a terminal or server of a local government in the area to the management server 600. When the management server 600 receives the disaster information, the management server 600 sends the received disaster information to the charging station 300 installed in the area in which entry of vehicles is restricted.

When the control device 308 determines that the charging station 300 has received the disaster information (YES in S100), the control device 308 permits raising the movable portion 300a of the charging station 300 (S102). Therefore, when raising request information is subsequently sent from the management server 600 or the mobile terminal 700 to the charging station 300, the control device 308 controls the raising device 306 to switch the charging station 300 from the first state to the second state in response to the raising request information. The charging station 300 thus becomes ready for use by the user.

When the control device 308 determines that the charging station 300 has not received the disaster information (NO in S100), the control device 308 prohibits raising the movable portion 300a of the charging station 300 (S104). The charging station 300 is thus kept in the first state even when the charging station 300 receives the raising request information from the management server 600 or the mobile terminal 700.

It is assumed that event information is sent from a terminal or server of an event organizer etc. to the management server 600 when, for example, an event is held in or around a place including an area in which entry of vehicles is restricted, such as in or around a park. When the management server 600 receives the event information, the management server 600 sends the received event information to the charging station 300 installed in either an area within an event venue in which entry of vehicles is restricted or an area around the event venue in which entry of vehicles is restricted.

When the control device 308 determines that the charging station 300 has received the event information (YES in S200), the control device 308 determines whether the current time is during the hours specified by the event information (S202). When the control device 308 determines that the current time is during the hours specified by the event information (YES in S202), the control device 308 permits raising the movable portion 300a of the charging station 300 (S204). Therefore, when raising request information is subsequently sent from the management server 600 or the mobile terminal 700 to the charging station 300, the control device 308 controls the raising device 306 to switch the charging station 300 from the first state to the second state in response to the raising request information. The charging station 300 thus becomes ready for use by the user.

When the control device 308 determines that the charging station 300 has not received the event information (NO in S200), or when the control device 308 determines that the charging station 300 has received the event information (YES in S200) but determines that the current time is before or after the hours specified by the event information (NO in S202), the control device 308 prohibits raising the movable portion 300a of the charging station 300 (S206). The charging station 300 is thus kept in the first state even when the charging station 300 receives the raising request information from the management server 600 or the mobile terminal 700.

As described above, according to the charging station 300 that is the charging apparatus of the present embodiment, the control device 308 permits raising the movable portion 300a of the charging station 300 when the control device 308 receives request information requesting emergency use of the charging station 300 such as in the event of a disaster or when an event is held (disaster information or event information). The charging station 300 can therefore be used in an emergency in which the number of users increases. The charging apparatus that can be used without reducing the convenience in an emergency can thus be provided.

The control device 308 prohibits raising the movable portion 300a of the charging station 300 when the control device 308 does not receive the request information. This reduces the possibility that the charging apparatus installed in the area in which entry of vehicles is restricted may be used in a non-emergency situation.

Hereinafter, modifications will be described. In the above embodiment, the power supply 350 is an AC power supply. However, the power supply 350 may be a DC power supply. In this case, for example, the electrically powered vehicle 200 may not include the charger 212.

In the above embodiment, the configuration is described in which the connector 302 is stored in the storage space in the upper part of the movable portion 300a. However, for example, an exposed socket may be provided on a side surface of the upper part of the movable portion 300a. With this configuration, the user can charge the battery 214 of the electrically powered vehicle 200 by connecting the socket of the charging station 300 and the inlet 220 of the electrically powered vehicle 200 using a separate charging cable. Alternatively, a terminal portion that can be connected to an inlet on the bottom of the electrically powered vehicle 200 may be provided on the upper part of the movable portion 300a. With this configuration, the inlet of the electrically powered vehicle 200 and the charging station are electrically connected when the movable portion 300a is raised to the second state. Accordingly, the user can charge the battery 214 of the electrically powered vehicle 200 without performing the work of connecting the inlet of the electrically powered vehicle 200 and the charging station.

In the above embodiment, the housing of the charging station 300 has a cylindrical shape. However, the housing of the charging station 300 may have any shape that allows especially a raising and lowering operation, and is not particularly limited to the cylindrical shape. For example, the housing of the charging station 300 may be in the shape of a rectangular parallelepiped.

In the above embodiment, a site other than a parking lot within a park is described as the area in which entry of vehicles is restricted. However, the site is not particularly limited to the site within the park and may include, for example, sites other than a parking lot within a playground, a school, a stadium, or other public facilities.

In the above embodiment, the control device 308 always permits raising the movable portion 300a of the charging station 300 when the control device 308 receives the disaster information. However, for example, when the disaster information includes information specifying the hours during which the charging station 300 can be used, the control device 308 may permit raising the movable portion 300a of the charging station 300 only during the specified hours.

In the above embodiment, the control device 308 permits raising the movable portion 300a when the control device 308 receives the disaster information or the event information. However, the control device 308 may perform the raising control when the control device 308 receives the disaster information or the event information.

In the above embodiment, the raising device 306 raises and lowers the movable portion 300a in response to a raising request and a lowering request. However, the raising device 306 may be a device that allows the user to manually raise and lower the movable portion 300a. In this case, the raising device 306 can be configured so that the control device 308 can control a switching device that can switch the raising device 306 between a locked state and an unlocked state. The locked state is a state in which raising and lowering of the movable portion 300a is prohibited. The unlocked state is a state in which the prohibition of raising and lowering the movable portion 300a is lifted. When the control device 308 permits raising the movable portion 300a, the control device 308 switches the raising device 306 from the locked state to the unlocked state, so that the user can manually raise and lower the movable portion 300a.

In the above embodiment, the charging station 300 receives a raising request from the management server 600 or the mobile terminal 700. However, the charging station 300 may be configured to receive a raising request from, for example, the electrically powered vehicle 200. The electrically powered vehicle 200 may request raising of the movable portion 300a when communication with the charging station 300 is established. Alternatively, the user in the electrically powered vehicle 200 may request raising of the movable portion 300a by performing a raising request operation on a user interface (e.g., a touch panel display) of the electrically powered vehicle 200.

In the above embodiment, the control device 308 of the charging station 300 installed in the area in which entry of vehicles is restricted permits raising the movable portion 300a when the control device 308 determines that it has received request information requesting emergency use of the charging station 300. Moreover, the control device 308 prohibits raising the movable portion 300a when the control device 308 determines that it has not received the request information. However, the management server 600 that is a management device for managing the operation of a plurality of charging stations 300 may control the charging stations 300 according to whether the management server 600 has received the request information.

Figure 7:
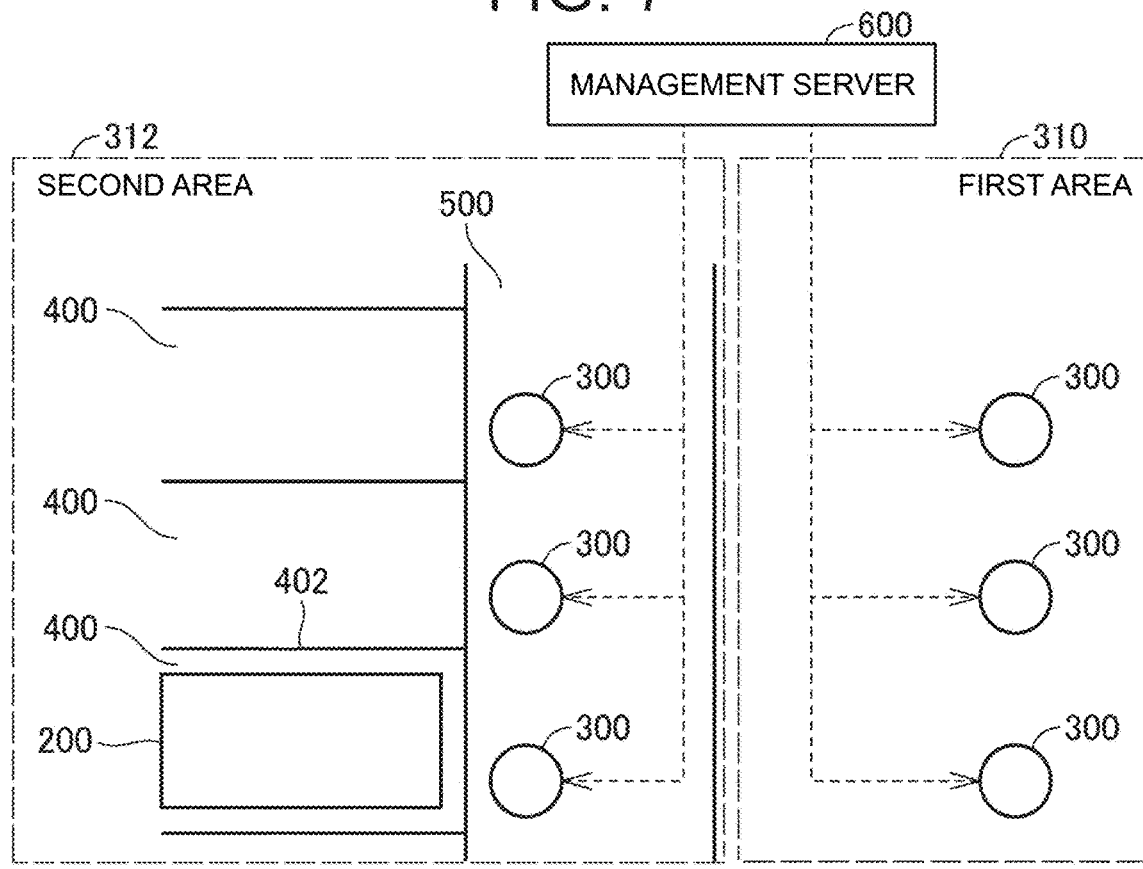
FIG. 7 illustrates the relationship between a plurality of charging stations and a management server.

FIG. 7 illustrates the relationship between the charging stations 300 and the management server 600. As shown in FIG. 7, it is herein assumed that the charging stations 300 are installed in first and second areas 310, 312. The first area 310 is located in a site other than a parking lot within a park etc., and entry of vehicles is restricted in the first area 310. The second area 312 serves as a parking lot.

The management server 600 permits or prohibits raising the movable portions 300a of the charging stations 300 installed in the first area 310 and the movable portions 300a of the charging stations 300 installed in the second area 312.

In this case, for example, the management server 600 may permit raising the movable portions 300a of the charging stations 300 installed in the first area 310 and permit raising the movable portions 300a of the charging stations 300 installed in the second area 312 when the management server 600 receives the request information. The management server 600 may prohibit raising the movable portions 300a of the charging stations 300 installed in the first area 310 and permit raising the movable portions 300a of the charging stations 300 installed in the second area 312 when the management server 600 does not receive the request information.

Figure 8:
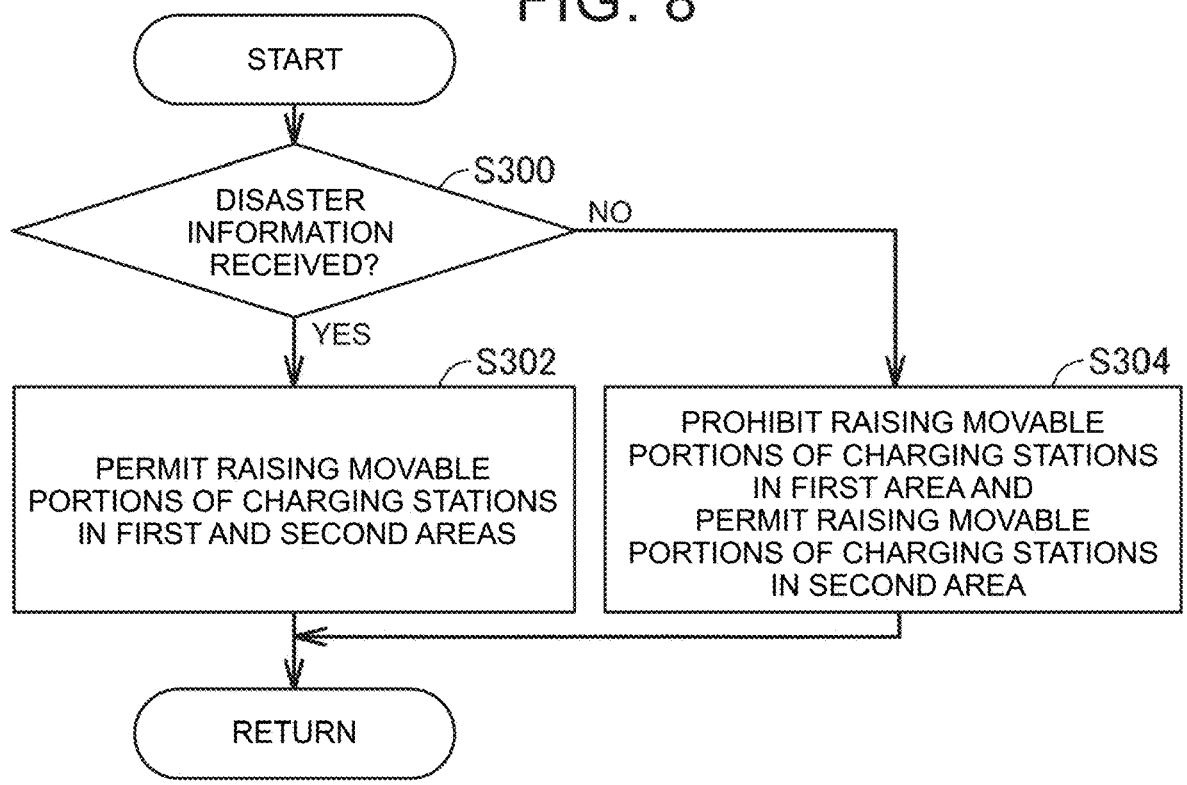
FIG. 8 is a flowchart showing an example of a process that is performed by a management server in a modification.

Hereinafter, an example of a control process that is performed by the management server 600 in a modification will be described with reference to FIG. 8. FIG. 8 is a flowchart showing an example of the process that is performed by the management server 600 in the modification. A series of steps shown in this flowchart is repeatedly performed in predetermined control cycles.

In S300, the management server 600 determines whether it has received disaster information. Since the disaster information is as described above, detailed description thereof will not be repeated. When the management server 600 receives the disaster information from, for example, a terminal or server of a local government etc., the management server 600 sets a flag indicating that the management server 600 has received the disaster information. When the flag is on, the management server 600 determines that it has received the disaster information. When the management server 600 determines that it has received the disaster information (YES in S300), the routine proceeds to S302.

In S302, the management server 600 permits raising the movable portions 300a of the charging stations 300 installed in the first area 310 and also permits raising the movable portions 300a of the charging stations 300 installed in the second area 312.

Specifically, the management server 600 sends permission information to each of the charging stations 300 installed in the first area 310 and the charging stations 300 installed in the second area 312. The permission information is information permitting raising the movable portion 300a of the charging station 300.

When each charging station 300 receives the permission information and raising request information is subsequently sent from the management server 600 or the mobile terminal 700 to the charging station 300, the control device 308 of the charging station 300 that has received the raising request information controls the raising device 306 to switch the charging station 300 from the first state to the second state. Each charging station 300 thus switched to the second state is ready for use by the user. The management server 600 then ends the process.

When the management server 600 determines that it has not received the disaster information (NO in S300), the routine proceeds to S304.

In S304, the management server 600 prohibits raising the movable portions 300a of the charging stations 300 installed in the first area 310 and permits raising the movable portions 300a of the charging stations 300 installed in the second area 312.

Specifically, the management server 600 sends prohibition information to each of the charging stations 300 installed in the first area 310. The prohibition information is information prohibiting raising the movable portion 300a of the charging station 300. The management server 600 also sends the permission information to each of the charging stations 300 installed in the second area 312.

When the charging station 300 in the first area 310 receives the prohibition information, the charging station 300 in the first area 310 is kept in the first state even when the charging station 300 in the first area 310 subsequently receives raising request information from the management server 600 or the mobile terminal 700. When the charging stations 300 in the first area 310 are in the second state and receive the prohibition information, the raising devices 306 may be controlled to switch the charging stations 300 from the second state to the first state.

When the charging station 300 in the second area 312 receives the permission information and subsequently receives raising request information from the management server 600 or the mobile terminal 700, the control device 308 of the charging station 300 that has received the raising request information controls the raising device 306 to switch the charging station 300 from the first state to the second state. The management server 600 then ends the process.

Figure 9:
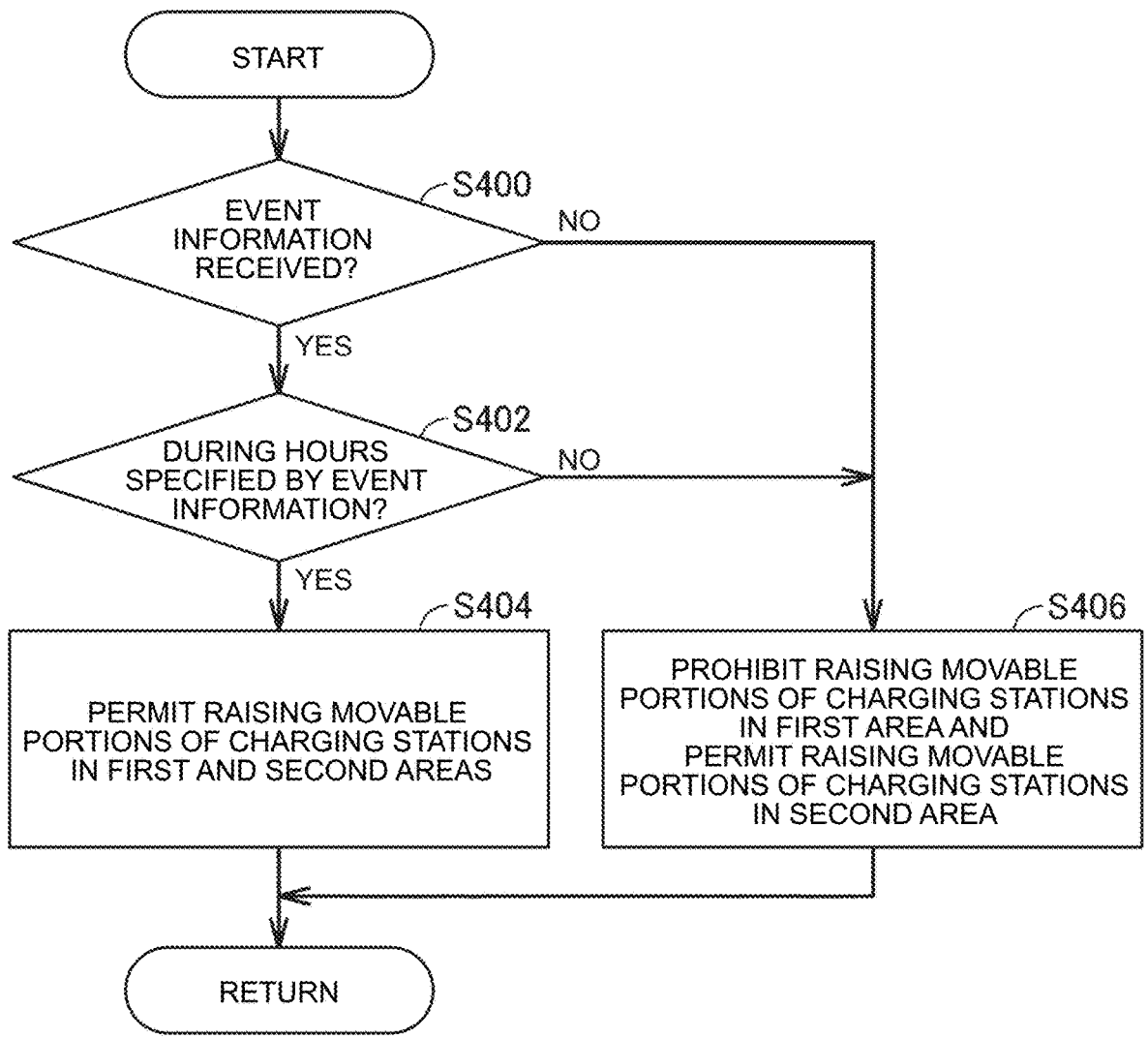
FIG. 9 is a flowchart showing another example of the process that is performed by the management server in the modification.

Next, another example of the control process that is performed by the management server 600 in the modification will be described with reference to FIG. 9. FIG. 9 is a flowchart showing another example of the process that is performed by the management server 600 in the modification. A series of steps shown in this flowchart is repeatedly performed in predetermined control cycles.

In S400, the management server 600 determines whether it has received event information. Since the event information is as described above, detailed description thereof will not be repeated. When the management server 600 receives the event information from, for example, a terminal or server of an event organizer, an organization that manages an area in which entry of vehicles is restricted, or a local government of a region including the area, the management server 600 sets a flag indicating that the management server 600 has received the event information. When the flag is on, the management server 600 determines that it has received the event information. When the management server 600 determines that it has received the event information (YES in S400), the routine proceeds to S402.

In S402, the management server 600 determines whether the current time is during the hours specified by the event information. For example, the management server 600 may acquire the current time using a timer device or may acquire the time synchronized over the Internet etc. as the current time. When the management server 600 determines that the current time is during the hours specified by the event information (YES in S402), the routine proceeds to S404.

In S404, the management server 600 permits raising the movable portions 300a of the charging stations 300 installed in the first area 310 and also permits raising the movable portions 300a of the charging stations 300 installed in the second area 312. Since S404 is similar to S302 described above, detailed description thereof will not be repeated. The management server 600 then ends the process.

When the management server 600 determines that it has not received the event information (NO in S400) or when the management server 600 determines that the current time is not during the hours specified by the event information (NO in S402), the routine proceeds to S406.

In S406, the management server 600 prohibits raising the movable portions 300a of the charging stations 300 installed in the first area 310 and permits raising the movable portions 300a of the charging stations 300 installed in the second area 312. Since S406 is similar to S304 described above, detailed description thereof will not be repeated. The management server 600 then ends the process.

An example of the operation of the management server 600 that is a management device for the charging stations 300 in the modification based on the above flowcharts will be described. It is herein assumed that the charging stations 300 installed in the first area 310 and the charging stations 300 installed in the second area 312 are in the first state.

For example, it is assumed that when a disaster occurs in a region including the first area 310 and the second area 312, disaster information is sent from a terminal or server of a local government of the region to the management server 600.

When the management server 600 determines that it has received the disaster information (YES in S300), the management server 600 permits raising the movable portions 300a of the charging stations 300 installed in the first area 310 and also permits raising the movable portions 300a of the charging stations 300 installed in the second area 312 (S302). Therefore, when raising request information is subsequently sent from the management server 600 or the mobile terminal 700 to the charging station 300, the control device 308 of the charging station 300 that has received the raising request information controls the raising device 306 to switch the charging station 300 from the first state to the second state. The charging station 300 thus switched to the second state is ready for use by the user.

When the management server 600 determines that it has not received the disaster information (NO in S300), the management server 600 prohibits raising the movable portions 300a of the charging stations 300 installed in the first area 310 and permits raising the movable portions 300a of the charging stations 300 installed in the second area 312 (S304). Therefore, even when the raising request information is sent from the management server 600 or the mobile terminal 700 to the charging station 300 installed in the first area 310, the charging station 300 that has received the raising request information is kept in the first state.

When the raising request information is sent from the management server 600 or the mobile terminal 700 to the charging station 300 installed in the second area 312, the control device 308 of the charging station 300 that has received the raising request information controls the raising device 306 to switch the charging station 300 from the first state to the second state.

It is assumed that, for example, event information is sent from a terminal or server of an event organizer etc. to the management server 600 when an event is held either in or around a place including the first area 310 and the second area 312.

When the management server 600 determines that it has received the event information (YES in S400), the management server 600 determines whether the current time is during the hours specified by the event information (S402). When the management server 600 determines that the current time is during the hours specified by the event information (YES in S402), the management server 600 permits raising the movable portions 300a of the charging stations 300 installed in the first area 310 and also permits raising the movable portions 300a of the charging stations 300 installed in the second area 312 (S404). Therefore, when raising request information is subsequently sent from the management server 600 or the mobile terminal 700 to the charging station 300, the control device 308 of the charging station 300 that has received the raising request information controls the raising device 306 to switch the charging station 300 from the first state to the second state.

When the management server 600 determines that it has not received the event information (NO in S400), or when the management server 600 determines that it has received the event information (YES in S400) but determines that the current time is before or after the hours specified by the event information (NO in S402), the management server 600 prohibits raising the movable portions 300a of the charging stations 300 installed in the first area 310 and permits raising the movable portions 300a of the charging stations 300 installed in the second area 312 (S406). Therefore, even when the raising request information is sent from the management server 600 or the mobile terminal 700 to the charging station 300 installed in the first area 310, the charging station 300 that has received the raising request information is kept in the first state.

When the raising request information is sent from the management server 600 or the mobile terminal 700 to the charging station 300 installed in the second area 312, the control device 308 of the charging station 300 that has received the raising request information controls the raising device 306 to switch the charging station 300 from the first state to the second state.

In this configuration as well, the management server 600 permits raising the movable portions 300a of the charging stations 300 installed in the first area 310 when the management server 600 receives request information requesting emergency use of the charging station 300 such as in the event of a disaster or when an event is held (disaster information or event information). The charging stations 300 installed in the first area 310 can therefore be used in an emergency in which the number of users increases. The management server 600 prohibits raising the movable portions 300a of the charging stations 300 in the first area 310 when the management server 600 does not receive the request information. This reduces the possibility that the charging stations 300 installed in the first area 310 may be used in a non-emergency situation. The management device for charging apparatus that can be used without reducing the convenience in an emergency can thus be provided.

All or part of the above modifications may be combined as appropriate. The embodiment disclosed herein should be considered illustrative in all respects and not restrictive. The scope of the present disclosure is defined by the claims rather than by the above description, and is intended to include all modifications within the meaning and scope equivalent to those of the claims.

What is claimed is:

1. A charging apparatus installed on a bottom of a recess in ground and configured to charge an energy storage device mounted on a vehicle, the charging apparatus comprising:
   a housing including a connector that is connectable to the energy storage device;
   an actuator configured to raise and lower the housing between a first state and a second state, the first state being a state in which the housing is stored in the ground, and the second state being a state in which the housing is exposed on the ground and the energy storage device and the connection device are connectable together;
   a communication device configured to communicate with a device outside the charging apparatus; and
   a processor configured to
      receive disaster information via the communication device, the disaster information being information indicating that a disaster has occurred in a region including an area where the charging apparatus is installed,
      permit raising the housing in response to the receiving of the disaster information via the communication device, and control the actuator to raise the housing to be in the second state, and
   prohibit raising the housing in absence of the disaster information, and keep the housing to be in the first state.

2. The charging apparatus according to claim 1, wherein the disaster information is received via the communication device from a local government of the region.

3. The charging apparatus according to claim 1, wherein the charging apparatus is installed in a first area or a second area, the first area is an area in which entry of the vehicle is restricted, and the second area is a parking,
   in response to the receiving of the disaster information, the processor is configured to
      permit raising the housing of the charging apparatus installed in the first area and the second area, and
   in absence of the disaster information, the processor is configured to
      permit raising the housing of the charging apparatus installed in the second area, and
      prohibit raising the housing of the charging apparatus installed in the first area.

4. The charging apparatus according to claim 1, wherein the processor is configured to permit manual raising and lowering of the housing by controlling the actuator from an unlocked state to a locked state, the locked state being a state where the raising and lowering the housing by the actuator is prohibited and manual raising and lowering of the housing is permitted, and the unlocked state being a state where the raising and lowering of the housing by the actuator is permitted and the manual raising and lowering of the housing is prohibited.

5. A management device configured to manage operation of a plurality of charging apparatuses, each of the charging apparatuses being installed on a bottom of a recess in ground and being configured to charge an energy storage device mounted on a vehicle, each of the charging apparatuses including a housing, an actuator, a communication device, and a first processor, the housing including a connector that is connectable to the energy storage device, the communication device being configured to communicate with the management device, the actuator being configured to raise and lower the housing between a first state and a second state, the first state being a state in which the housing is stored in the ground, the second state being a state in which the housing is exposed on the ground and the energy storage device and the connection device are connectable together, the first processor being configured to control the actuator using information received via the communication device, and the charging apparatuses being installed in each of a first area in which entry of the vehicle is restricted and a second area in which entry of the vehicle is not restricted, the management device comprising a second processor, the second processor being configured to:
   receive disaster information, the disaster information being information indicating that a disaster has occurred in a region including an area where the charging apparatus is installed;
   in response to receiving the disaster information, send the disaster information to the communication device of each of the charging apparatus and cause the first processor of each of the charging apparatus to permit raising the housing of the charging apparatuses installed in the first area and the second area, and control the actuator to raise the housing to be in the second state; and
   in absence of the disaster information, cause the first processor of each of the charging apparatus to
      prohibit raising the housing of the charging apparatus installed in the first area and keep the housing to be in the first state, and
      permit raising the housing of the charging apparatus installed in the second area and control the actuator to raise the housing to be in the second state.

6. The management device according to claim 5, wherein the disaster information is received via the communication device from a local government of the region.

7. The management device according to claim 5, wherein the first area is an area in which entry of the vehicle is restricted, and the second area is a parking.

8. The management device according to claim 5, wherein the second processor is configured to permit manual raising and lowering of the housing by controlling the actuator from an unlocked state to a locked state, the locked state being a state where the raising and lowering the housing by the actuator is prohibited and manual raising and lowering of the housing is permitted, and the unlocked state being a state where the raising and lowering of the housing by the actuator is permitted and the manual raising and lowering of the housing is prohibited.

* * * * *